United States Patent [19]

Neumayr

[11] Patent Number: 5,351,911
[45] Date of Patent: Oct. 4, 1994

[54] VERTICAL TAKEOFF AND LANDING (VTOL) FLYING DISC

[76] Inventor: George A. Neumayr, 2536 10th Ave. North, Apt. 302S, Lake Worth, Fla. 33461-3124

[21] Appl. No.: 1,319

[22] Filed: Jan. 6, 1993

[51] Int. Cl.⁵ .......................... B64C 29/00; B64B 1/20
[52] U.S. Cl. ................... 244/23 C; 244/12.2; 244/5; 244/23 D
[58] Field of Search ............... 244/5, 12.2, 12.4, 23 C, 244/23 D, 25, 67

[56] References Cited

U.S. PATENT DOCUMENTS

| | | | |
|---|---|---|---|
| 2,933,891 | 4/1960 | Britt | 244/23 D |
| 3,469,804 | 9/1969 | Rowan | 244/12 |
| 3,486,716 | 12/1969 | Haberkorn et al. | 244/23 D |
| 3,503,573 | 3/1970 | Modesti | 244/12 |
| 3,525,484 | 8/1970 | Mueller | 244/12 |
| 3,915,411 | 10/1975 | Surbaugh | 244/12 C |
| 4,014,483 | 3/1977 | MacNeill | 244/5 |
| 4,023,751 | 5/1977 | Richard | 244/23 C |
| 4,214,720 | 7/1980 | DeSautel | 244/12.2 |
| 4,433,819 | 2/1984 | Carrington | 244/12.2 |
| 4,799,629 | 1/1989 | Mori | 244/5 |
| 4,824,048 | 4/1989 | Kim | 244/12.2 |
| 5,064,143 | 11/1991 | Bucher | 244/12.2 |

FOREIGN PATENT DOCUMENTS 2635407  2/1978  Fed. Rep. of Germany ......... 244/5

*Primary Examiner*—Michael S. Huppert
*Assistant Examiner*—Virna Lissi Ansley
*Attorney, Agent, or Firm*—Malin, Haley, DiMaggio & Crosby

[57] ABSTRACT

A flying disc capable of vertical takeoff, hovering, or powered horizontal flight. The aircraft configuration comprises a circular disc-like airfoil-shaped wing structure having a convex upper surface and a concave lower surface with a leading edge and a trailing edge. At least one thrust-producing unit is attached at each of the leading and trailing edges, respectively. A plurality of other thrust-producing units are mounted symmetrically about the circular wing structure. Each thrust-producing unit has attached thereto a thrust deflector assembly for angularly adjusting the thrust produced by the thrust-producing unit, thereby allowing the aircraft to fly both vertically and horizontally. A substantial volume of helium gas is stored encompassing the inner upper hull of the aircraft, thereby giving the flying disc greater lift capacity. The outer skin of the upper surface consists essentially of a plurality of solar panels for delivering power to a multiplicity of devices.

12 Claims, 17 Drawing Sheets

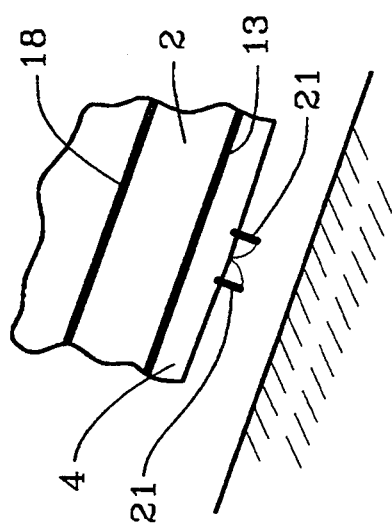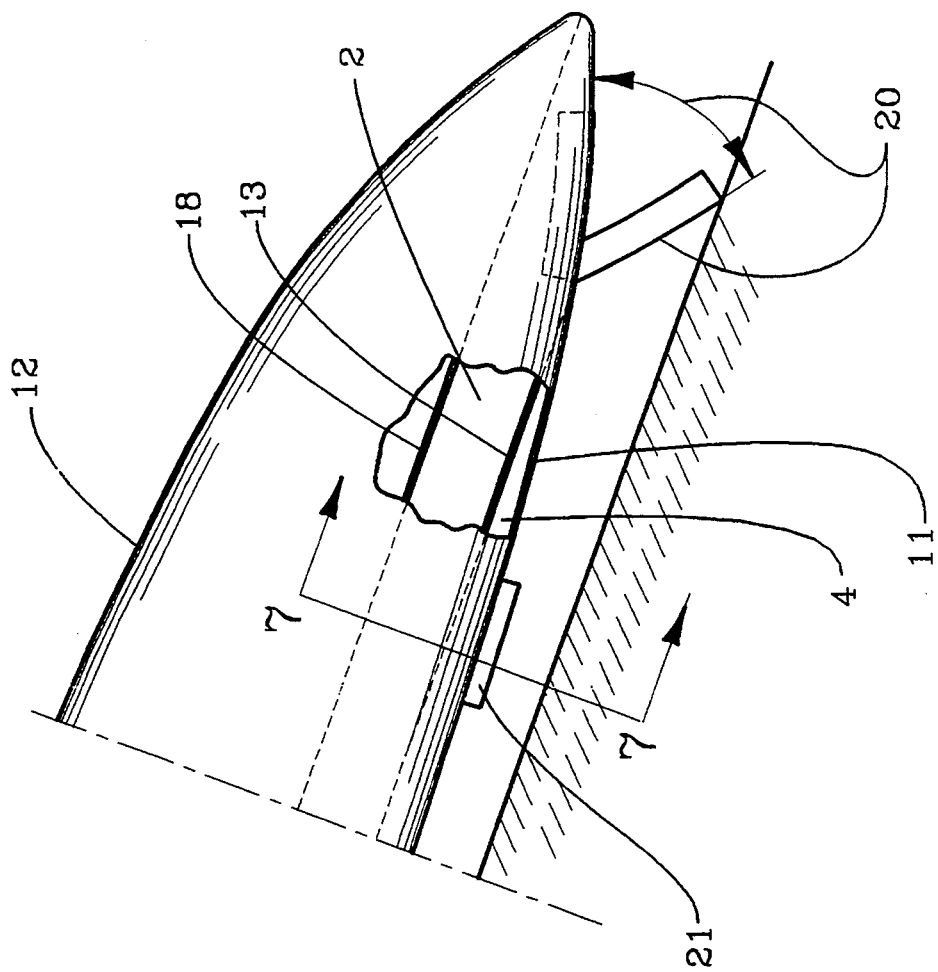

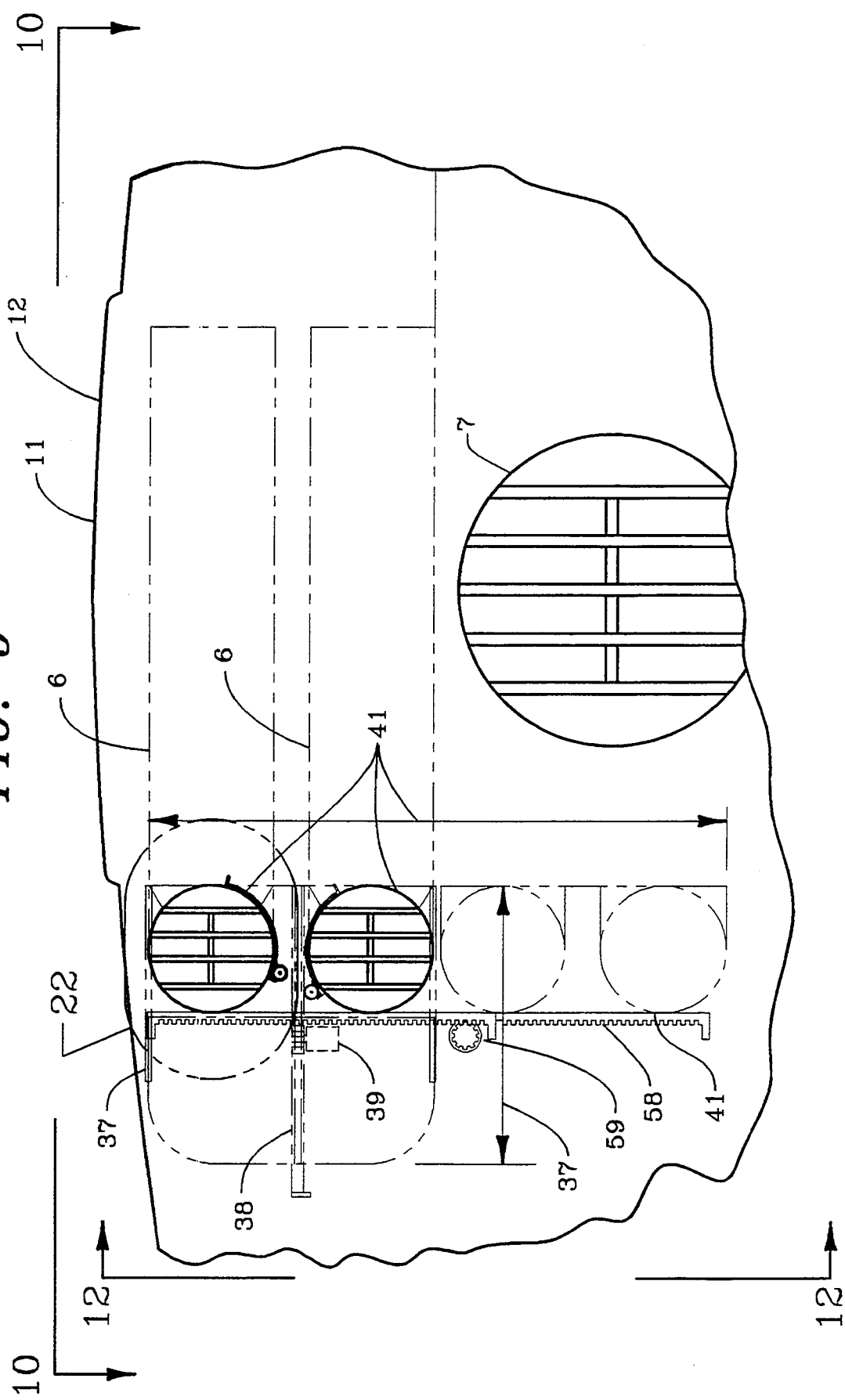

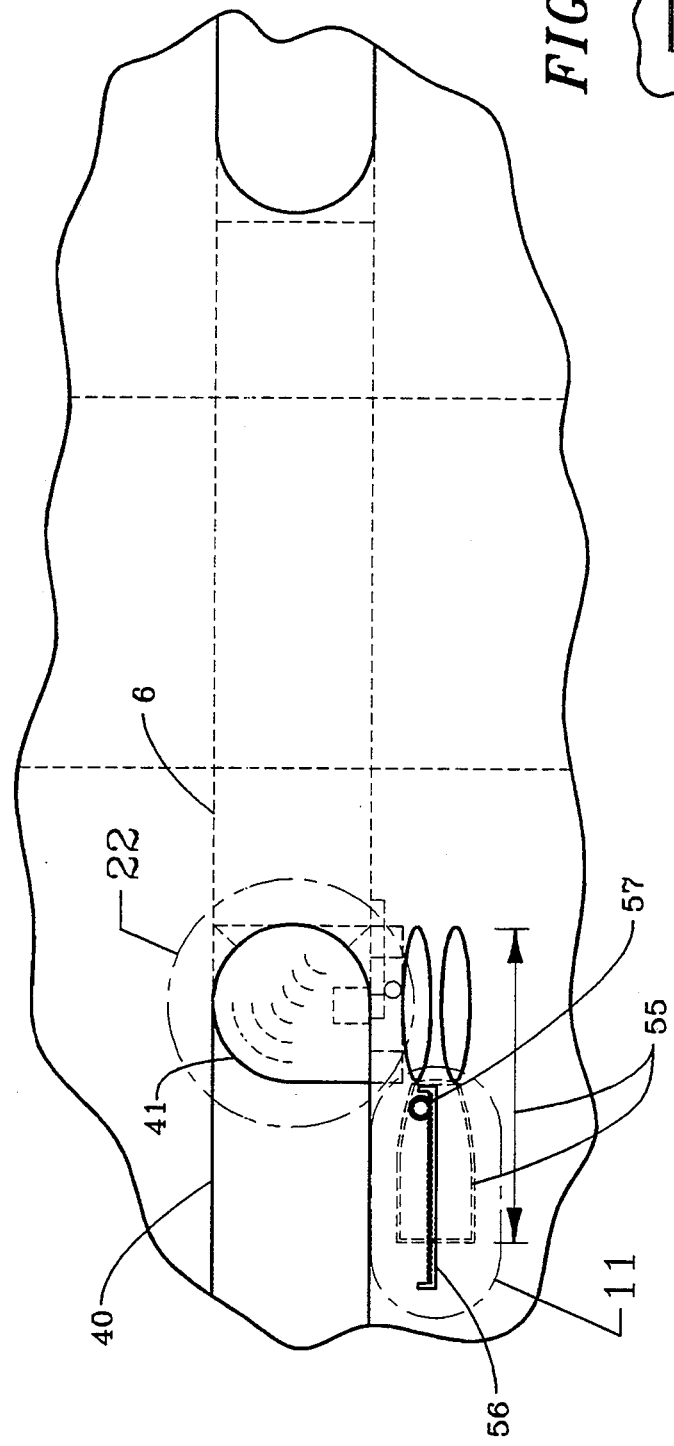
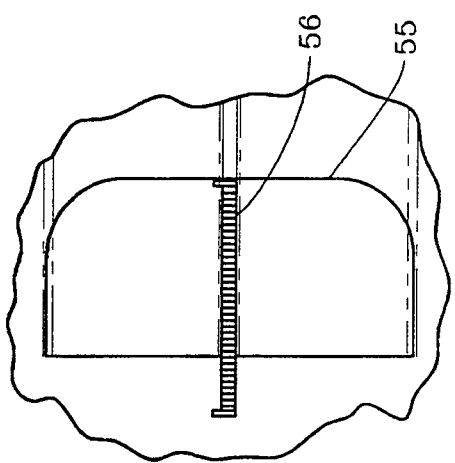

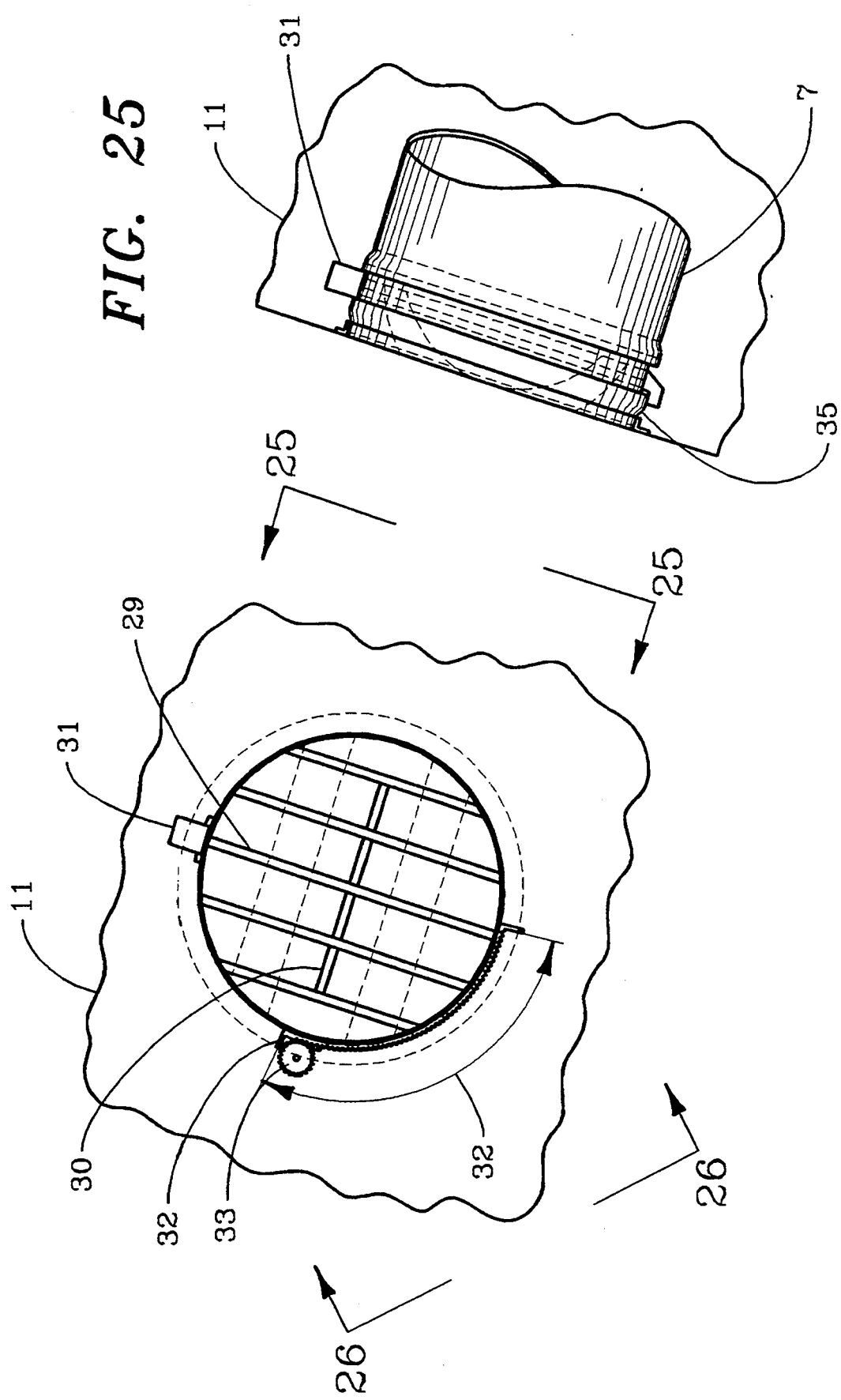

VERTICAL TAKEOFF AND LANDING (VTOL) FLYING DISC

BACKGROUND OF THE INVENTION

1. Field of the Invention

This invention relates generally to discoidal-shaped aircraft, and more particularly, to a discoidal-shaped aircraft capable of vertical takeoff and landing operations.

2. Description of the Prior Art

As seen in the prior art, there have been numerous efforts directed toward the designing and development of an aircraft which is capable of vertical takeoff and landing (VTOL) operations while still being able to move in a generally horizontal flight path at great speeds and efficiency.

The most common configuration of vertical takeoff and landing aircraft is the helicopter. The helicopter is capable of true vertical flight, including the ability to hover in place, fly forward and aft, and from side to side. Unfortunately, the helicopter has many limitations, the most significant thereof being its mechanical complexity and high operational expense. Moreover, the principles of aerodynamics result in obvious limitations on performance, most notably, the low maximum attainable forward velocities and reduced range when compared with fixed wing aircraft.

The prior art efforts exerted toward developing an operational procedure for a VTOL aircraft have been directed mainly toward the use of aircraft in which a takeoff or landing operation usually has the longitudinal axis of the fuselage disposed in a plane perpendicular to the ground so that the aircraft is propelled upwardly in a vertical direction and, upon reaching desired altitude, the aircraft is then rotated by means of the propulsion units to assume a horizontal position which is the normal flight attitude of an airplane. Similarly, efforts have been exerted toward developing an operational procedure wherein the spinning disc principle is used to produce vertical lift during takeoff or hovering of the craft, as well as to aid the discoidal spinning wing to move through ambient air and therefore aid in horizontal flight.

The problems in the prior art aircraft have been in developing an aircraft capable of both helicopter-type hovering flight and also high speed horizontal flight while still maintaining safety, reliability in operation, and being generally economical to manufacture, maintain, and use. In an aircraft operation of this type, the greatest difficulty is in carrying forth such a flight operation which entails the turning and rotating of the aircraft when in one position to the other position, in other words, from horizontal to vertical flight, while at the same time maintain the aircraft in a proper airborne altitude to prevent the same from falling or crashing to the surface.

The present invention is directed to a VTOL flying disc which is capable of making the transition from vertical to conventional flight without the need of the "spinning disc" effect, and which, by virtue of its power plant location and its lifting body-type fuselage, results in enhanced performance both in vertical takeoff and horizontal flight modes.

SUMMARY OF THE INVENTION

In accordance with the instant invention, there is disclosed a VTOL aircraft in the form of a flying disc capable of both helicopter-type hovering flight and also high speed horizontal flight. The present invention reduces the cost of traveling, and makes airport runways obsolete. The present invention is unsinkable on water, has a reduced noise level, and is environmentally friendly. It has a horizontal flight speed comparable to a jumbo jet aircraft. The dimensional size of the present invention is about 5 ft. larger than the wing span and about 31 ft. smaller than the fuselage or airframe length of the Boeing 747 jumbo jet. The overall measurements are approximately 200 ft. in diameter with a maximum body height of 50 ft. The passenger deck configuration has a seating arrangement for approximately 756 passengers including flight crew and flight attendants. However, size of the aircraft is optional, allowing the instant invention to have both commercial and military applications.

The materials used for the aircraft's construction are to be of all available lightweight material, such as aluminum alloy, magnesium alloy, synthetic alloys, etc. where applicable or practical.

The aircraft configuration comprises a circular disc-like airfoil-shaped wing structure having a convex upper surface and a concave lower surface with a leading edge and a trailing edge. At least one propulsion or thrust-producing unit, preferably in the form of a jet engine, is attached at each of the leading and trailing edges, respectively, to aid in both VTOL and horizontal flight. Furthermore, a plurality of other thrust-producing units, preferably in the form of ducted fan assemblies, are mounted symmetrically about the circular wing structure, and they too aid in both VTOL and horizontal flight.

Each thrust-producing unit has attached thereto a thrust deflector assembly for angularly adjusting the thrust produced by the thrust-producing unit, thereby allowing the aircraft to fly both vertically and horizontally.

A substantial volume of helium gas is stored within the inner upper hull of the aircraft. The helium gas is of primary importance because it gives the flying disc greater lift capacity. As a result, the jet engines and ducted fan assemblies are not required to lift the full cross weight and payload of the flying disc in order to become airborne. In addition, the fuel consumption is reduced in both VTOL and horizontal flight.

The outer skin of the upper hull consists essentially of a plurality of solar panels for delivering power to a plurality of devices, both in and on the aircraft. The solar panels cover virtually the entire upper hull surface.

In accordance with the present invention, it is an object thereof to provide an aircraft generally of the discoidal type which is capable of vertical takeoff and landing operations while still being able to move in a horizontal flight path at great speeds and efficiency.

Another object is to provide a flying craft with a plurality of thrust-producing units mounted symmetrically about the circular wing structure, each thrust-producing unit having attached thereto a thrust deflector assembly for angularly adjusting the thrust produced by the thrust-producing unit.

A further object is to provide a flying craft as described, wherein a substantial volume of helium gas is stored within the inner upper hull of the craft.

A still further object is to provide a flying craft as described, wherein the outer skin of the upper hull consists essentially of a plurality of solar panels for delivering power to a plurality of devices.

In accordance with these and other objects which will be apparent hereinafter, the instant invention will now become described with particular reference to the accompanying drawings.

BRIEF DESCRIPTION OF THE DRAWINGS

FIG. 7 is a view generally along line 7—7 of FIG. 5;

FIG. 8 is a view generally along line 8—8 of FIG. 5;

FIG. 9 is a detail of section 9 of FIG. 5;

FIG. 10 is a view generally along line 10—10 of FIG. 9;

FIG. 11 is a detail of section 11 of FIG. 10;

FIG. 24 is a view generally along line 24—24 of FIG. 15;

FIG. 25 is a view generally along line 25—25 of FIG. 24;

DESCRIPTION OF THE PREFERRED EMBODIMENTS

Figure 1:
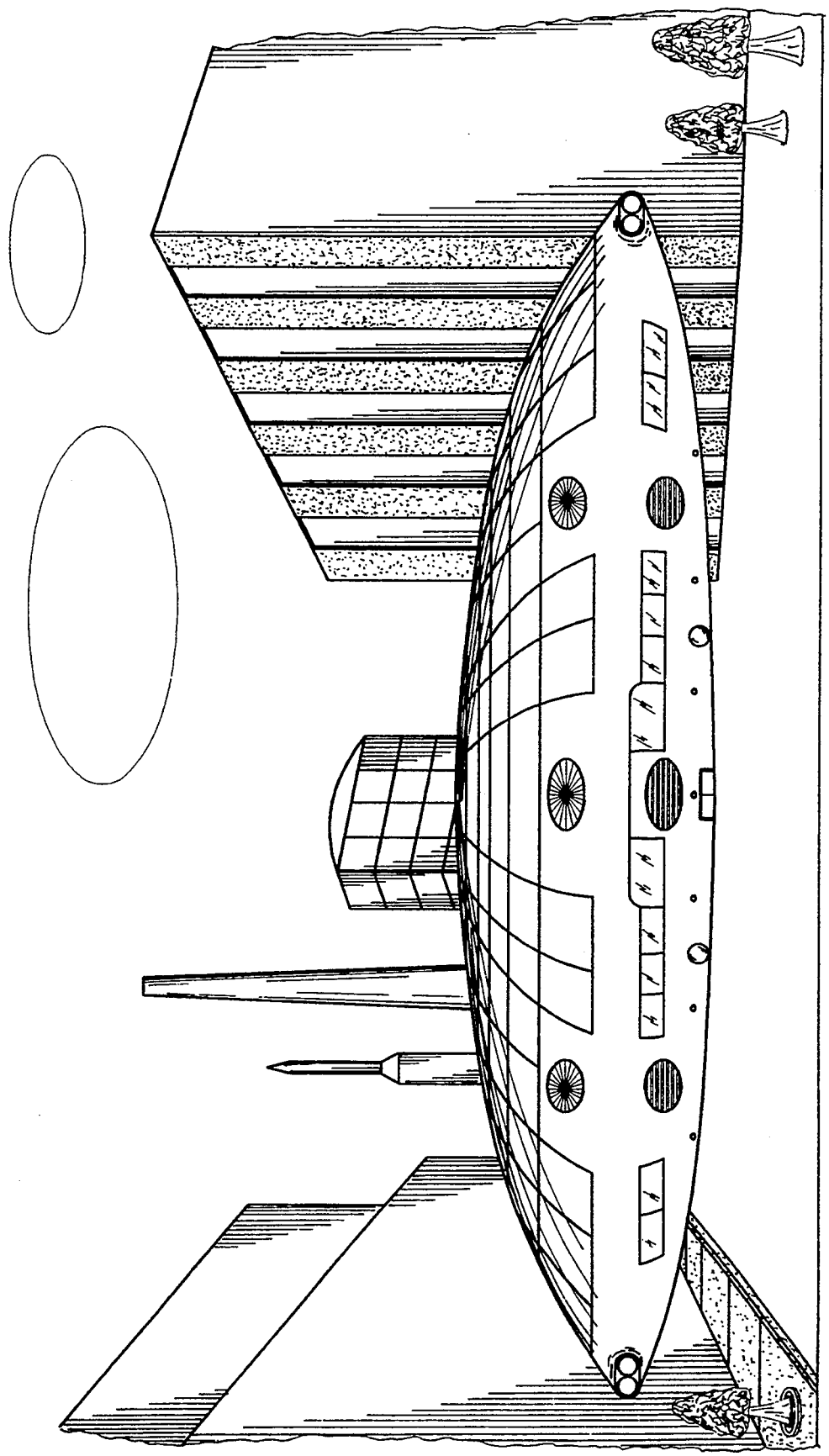
FIG. 1 is a front view of the VTOL flying disc.
Figure 2:
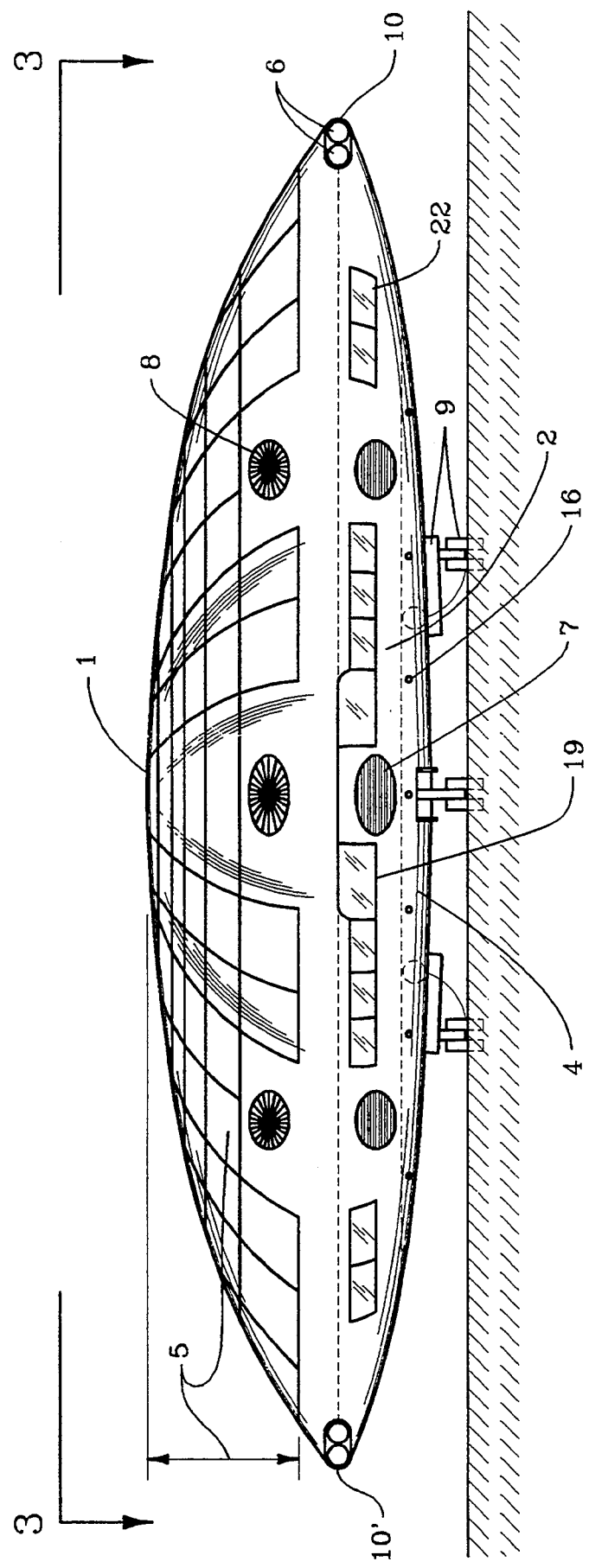
FIG. 2 is a view in perspective of the VTOL flying disc.
Figure 3:
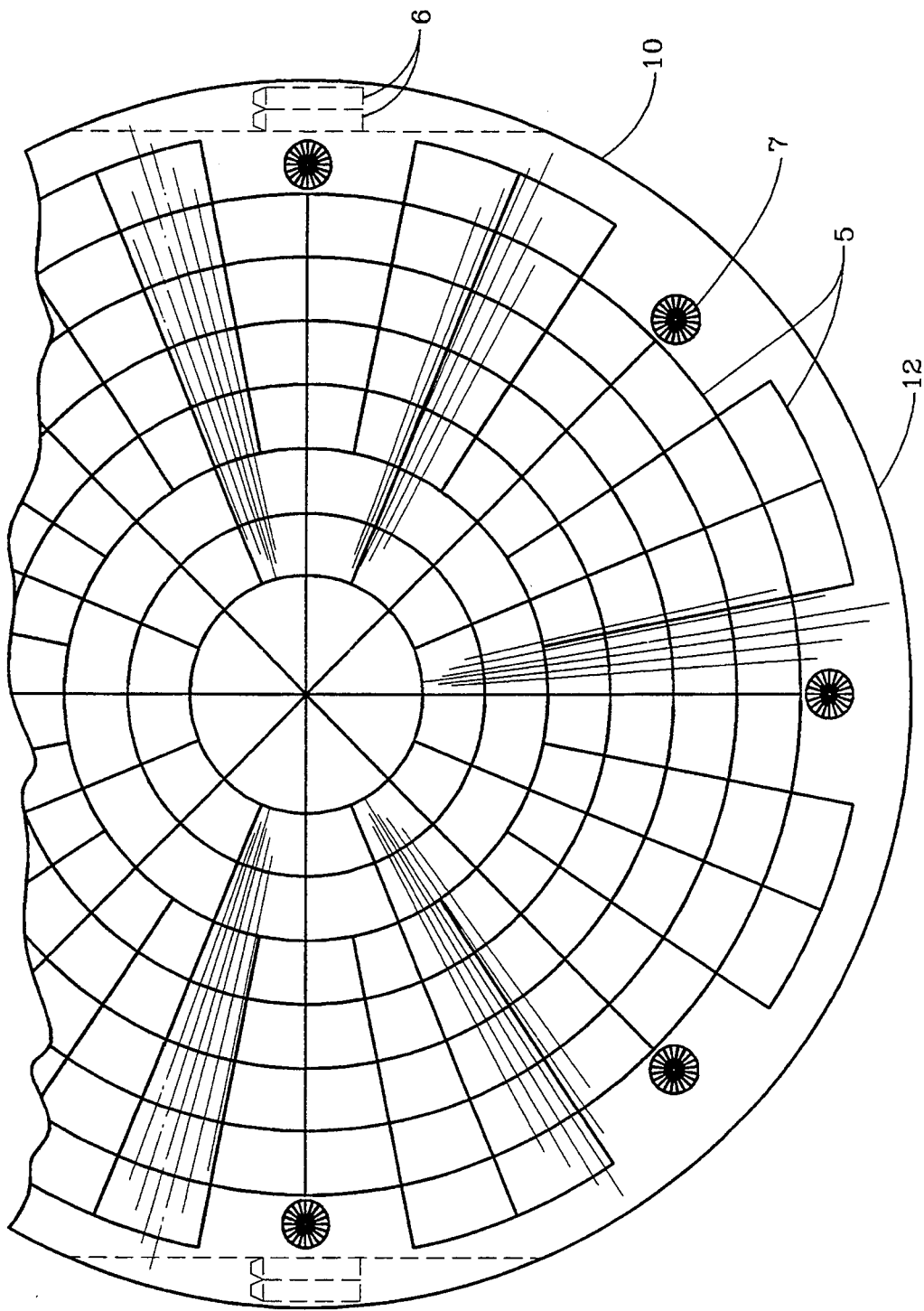
FIG. 3 is a view taken generally along line 3—3 in FIG. 2.
Figure 4:
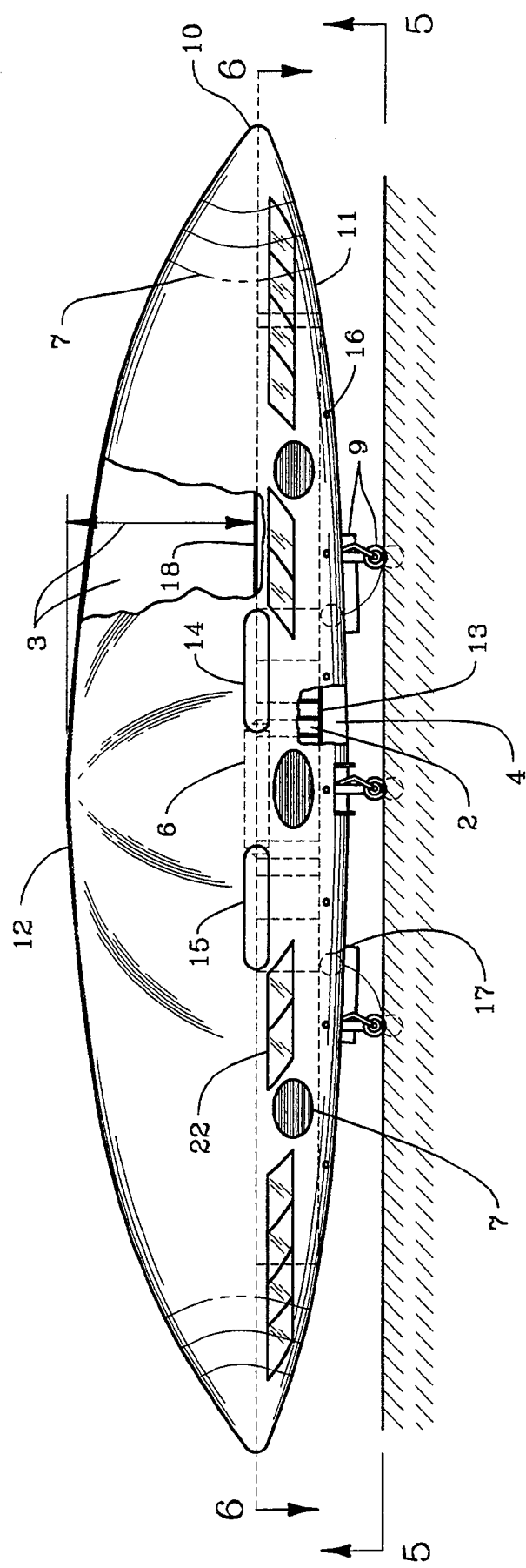
FIG. 4 is a side elevational view of the VTOL flying disc having portions broken away.
Figure 5:
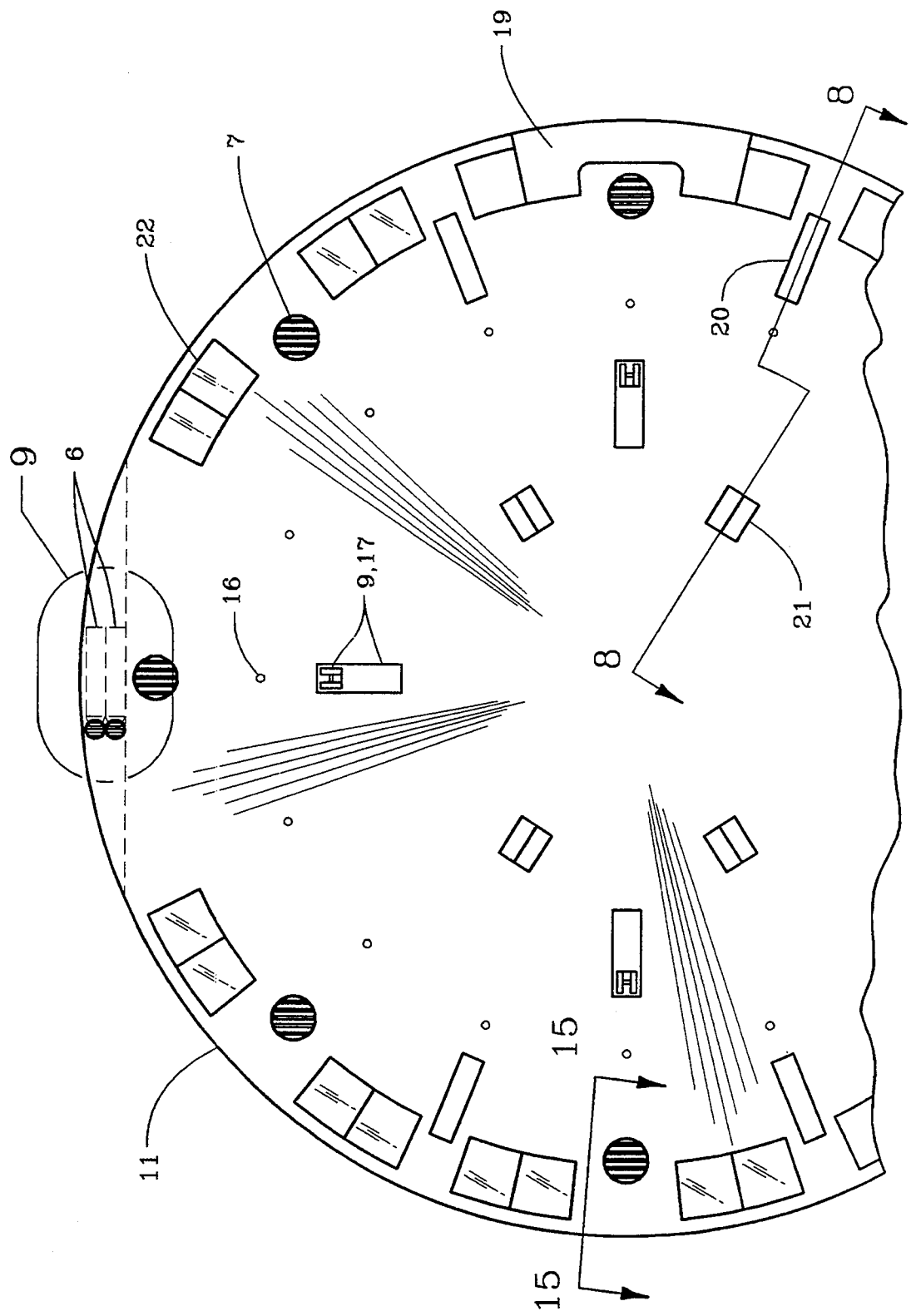
FIG. 5 is a view generally along line 5—5 of FIG. 4.
Figure 6:
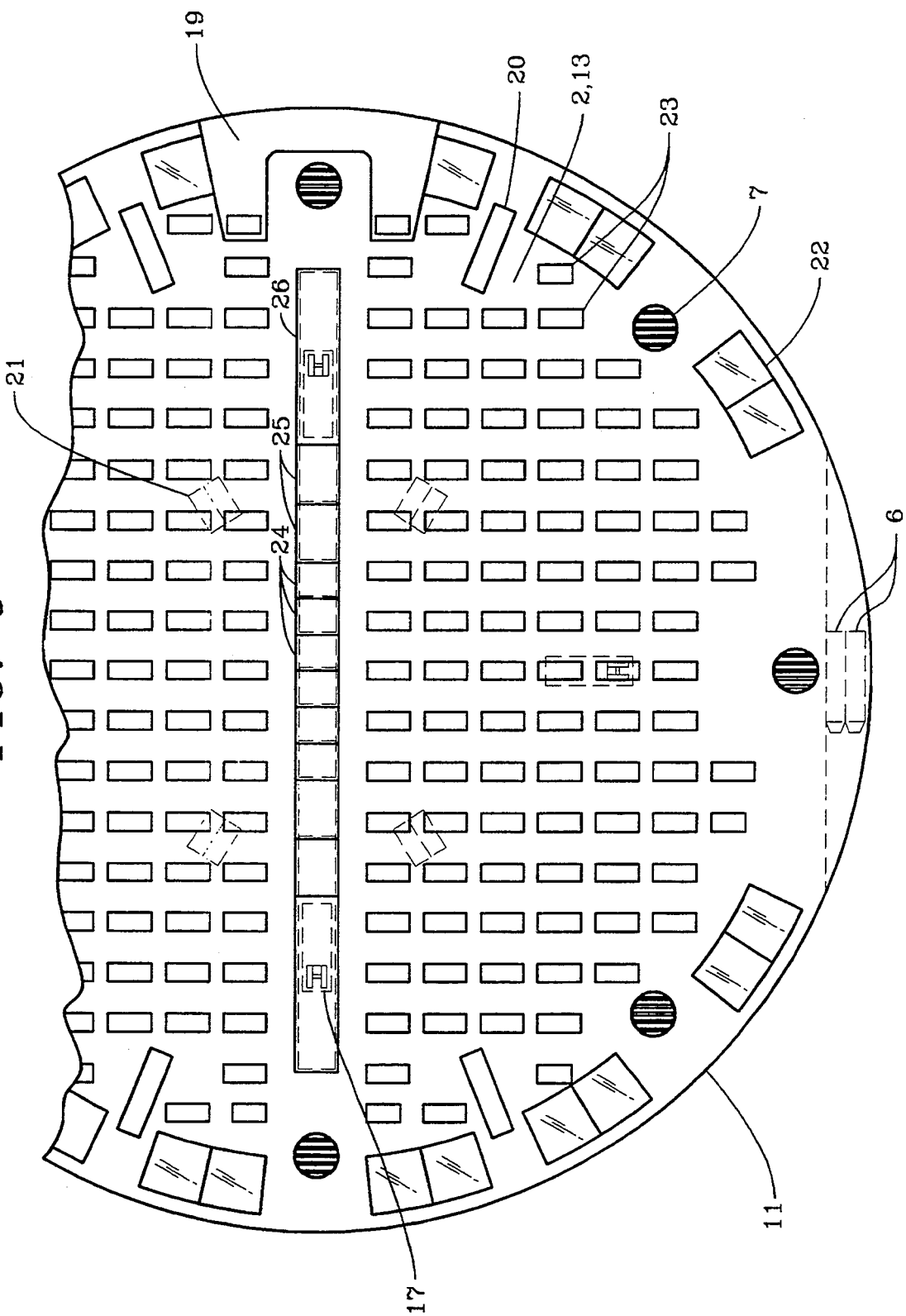
FIG. 6 is a view generally along line 6—6 of FIG. 4.
Figure 12:
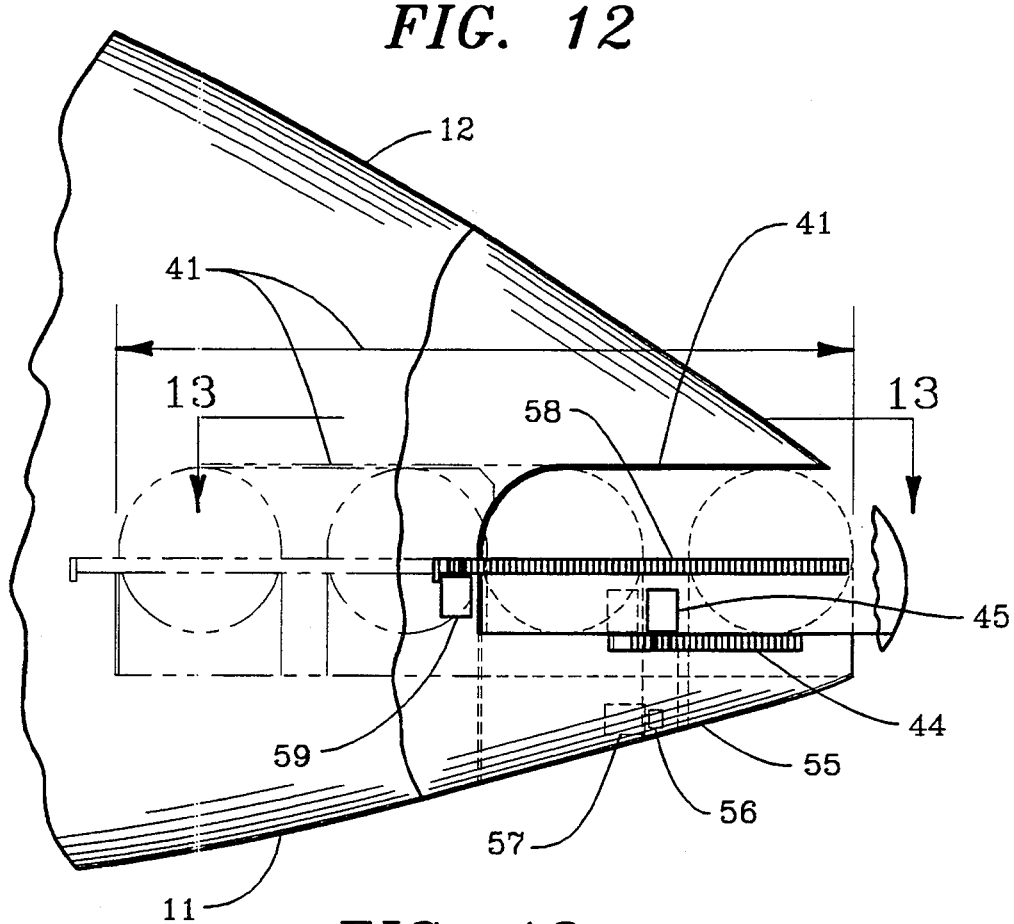
FIG. 12 is a view generally along line 12—12 of FIG. 9.
Figure 13:
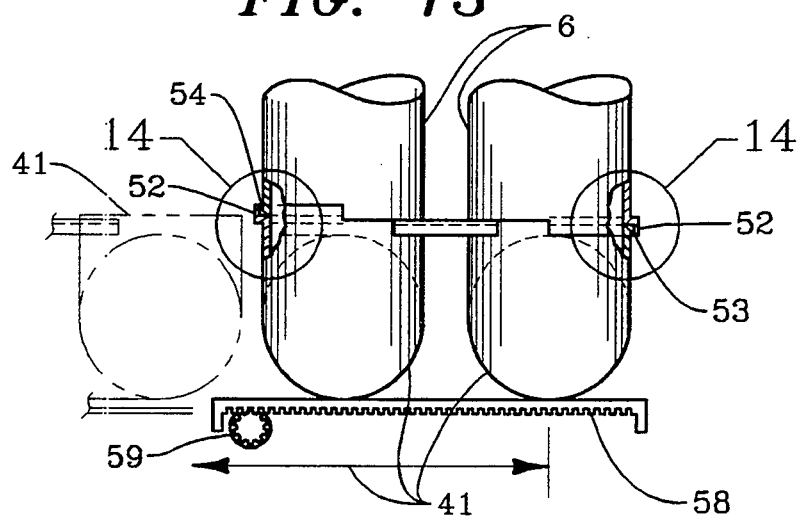
FIG. 13 is a view generally along line 13—13 of FIG. 12.
Figure 14:
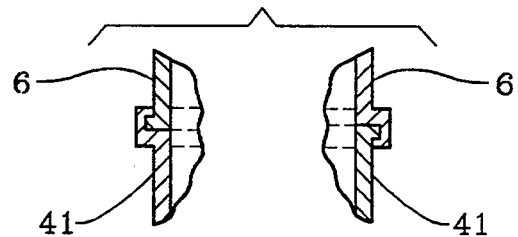
FIG. 14 is a detail of section 14 of FIG. 13.

With reference to the several views of the drawings, there is depicted a VTOL aircraft in the form of a flying disc, generally characterized by the reference numeral 1. As shown in FIGS. 1, 2 and 4, the aircraft is a circular disc-like airfoil-shaped wing structure having an upper hull 12 with a convex surface and a lower hull 11 with a concave surface. The aircraft has a leading edge 10 and a trailing 10' with at least one propulsion or thrust-producing unit 6 attached at each of the leading 10 and trailing 10' edges, respectively, to aid in both VTOL and horizontal flight, as will be described in detail hereinafter. In the preferred embodiment, the thrust-producing unit 6 is a jet engine assembly. As seen in FIGS. 2 and 5, a plurality of other propulsion units 7, preferably of the ducted fan assembly variety, are mounted symmetrically about the circular wing structure and they too aid in both VTOL and horizontal flight, as will be described in greater detail hereinafter.

Referring to FIGS. 2, 4, 5 and 6, the flying disc 1 is shown with passenger deck 2 having a seating arrangement 23 for approximately 756 passengers, including flight crew and flight attendants. A storage area 4 for cargo, fuel, landing gear, etc. is located below the floor 13 of passenger deck 2. Floodlights 16 are installed in lower hull 11. An inlet duct 14 and an outlet duct 15 are provided for the jet engines 6. A plurality of retractable landing gear assemblies and landing gear doors 9 and wheel wells 17 for the landing gear assemblies 9 are provided. Window panels 19 for the flight crew, and window panels 22 for scenic viewing for the passengers, are also included. Stairways 20 for ingress and egress of the aircraft are provided. Cargo doors 21 provide access to storage area 4. An additional storage area 26 is also provided, along with lavatories 24 and kitchen areas 25.

The ceiling 18 of passenger deck 2 provides a floor for housing helium gas 3, wherein the housing has as its upper boundary upper hull 12 and as its lower boundary passenger deck ceiling 18. A substantial volume of helium gas 3 is stored within the inner upper hull and is of primary importance because it gives the flying disc 1 greater lift capacity. As a result, the jet engines 6 and ducted fan assemblies 7 are not required to lift the full cross weight and payload of the aircraft 1 in order for the aircraft 1 to become airborne. In addition, the fuel consumption is reduced in both VTOL and horizontal or conventional flight.

The outer skin of upper hull 12 consists essentially of lightweight, high efficiency solar panels 5 which cover virtually the entire upper hull surface. The solar panels 5 may deliver electrical power for a plurality of devices; for example, the floodlights 16, all appliances, the heating and air conditioning systems, the landing gear assemblies 9, the cargo doors 21, all electric gear drives (described in detail hereinafter), and possibly power for the ducted fan assemblies 7, as will be described in greater detail hereinafter.

Figure 15:
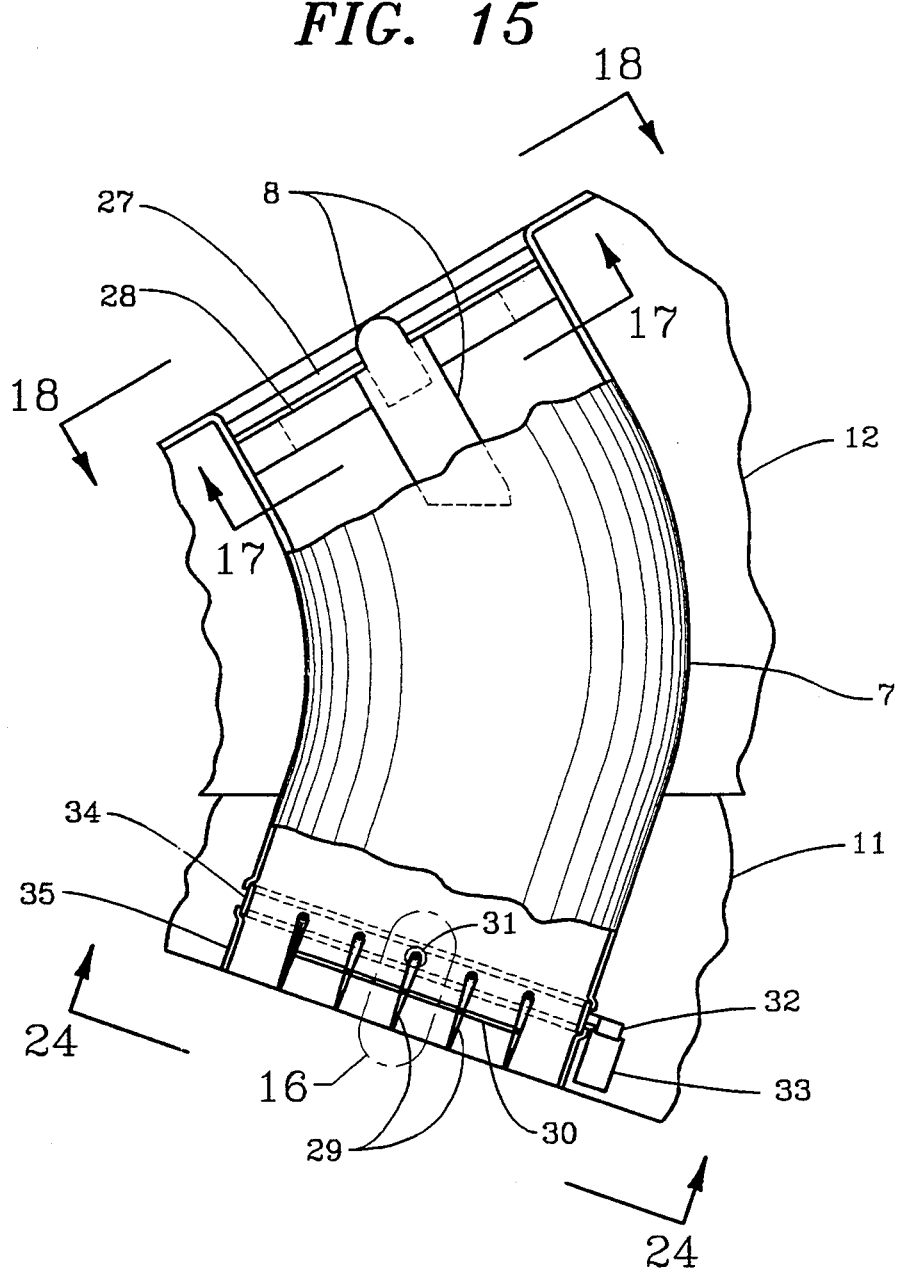
FIG. 15 is a view generally along line 15 of FIG. 5.
Figure 16:
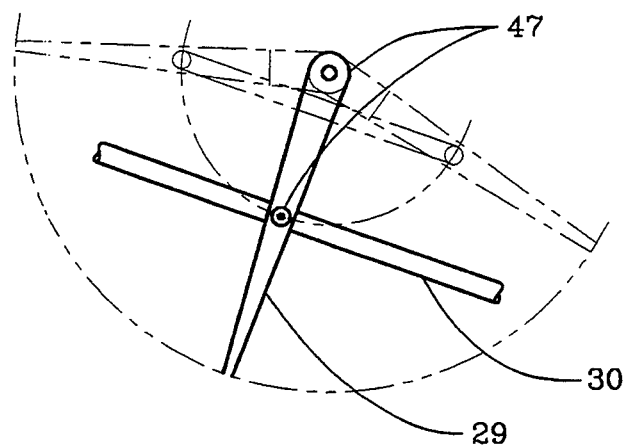
FIG. 16 is a detail of section 16 of FIG. 15.
Figure 17:
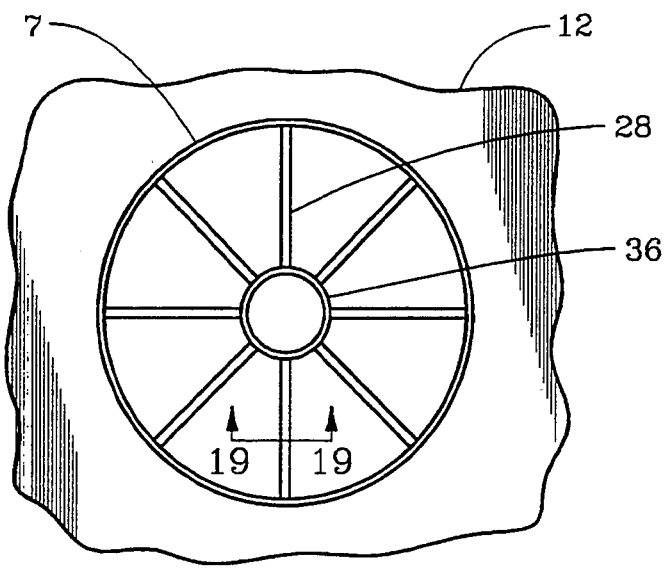
FIG. 17 is a view generally along line 17—17 of FIG. 15.
Figure 18:
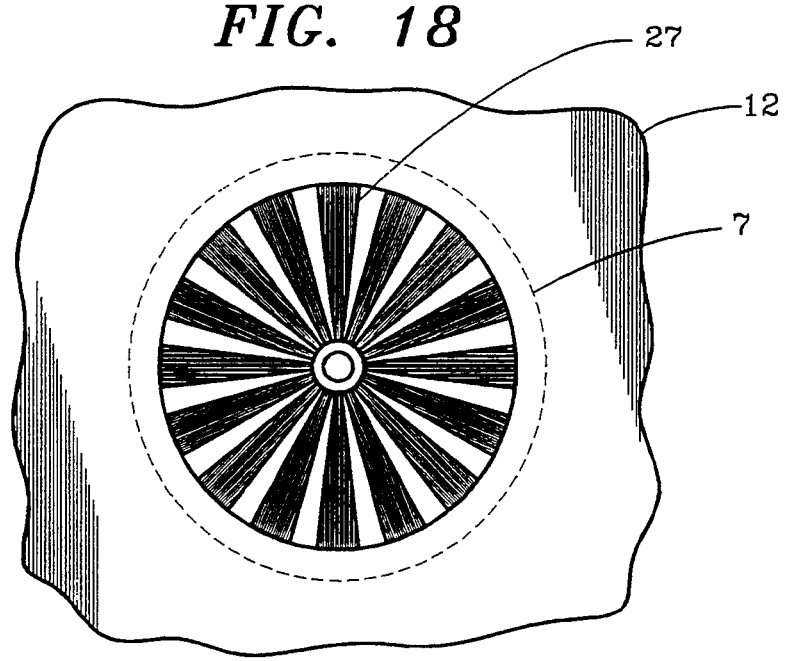
FIG. 18 is a view generally along line 18—18 of FIG. 15.
Figure 19:
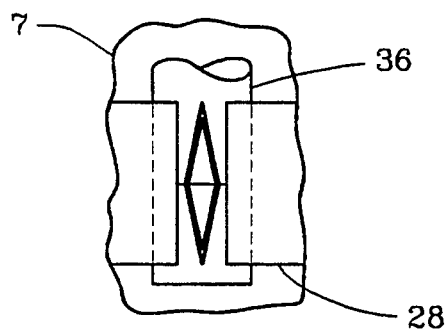
FIG. 19 is a view generally along line 19—19 of FIG. 17.
Figure 21:
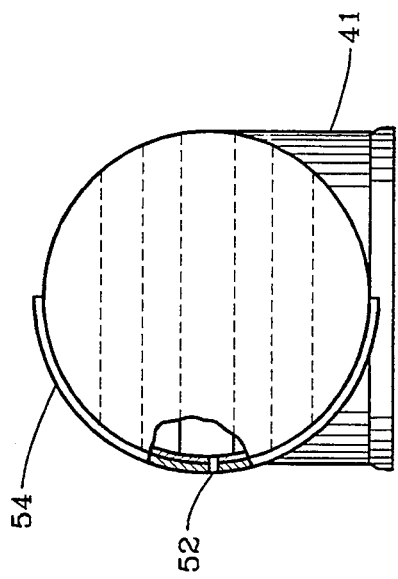
FIG. 21 is a view generally along line 21—21 of FIG.
Figure 23:
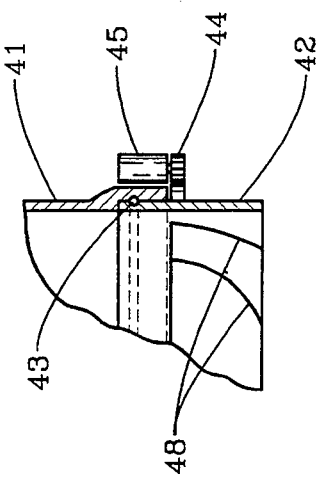
FIG. 23 is a view generally along line 23—23 of FIG. 20.
Figure 20:
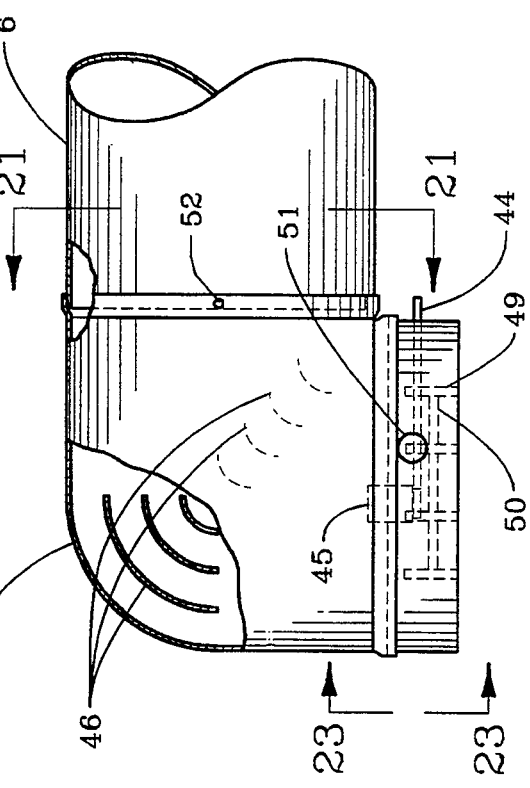
FIG. 20 is a detail of section 20 of FIG. 9.
Figure 22:
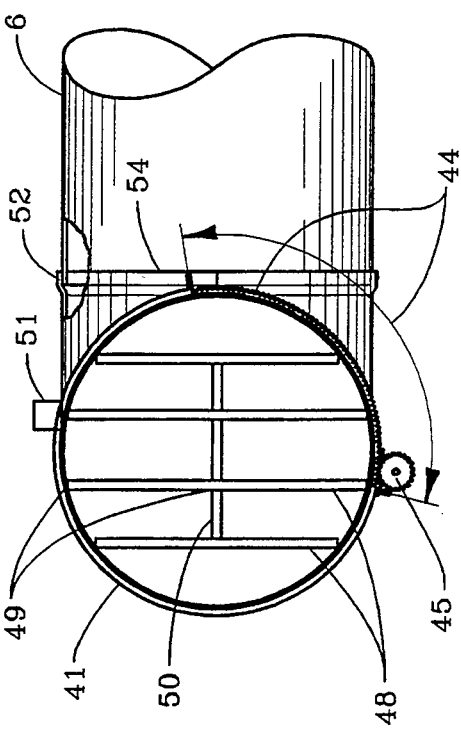
FIG. 22 is a detail of section 22 of FIG. 10.
Figure 26:
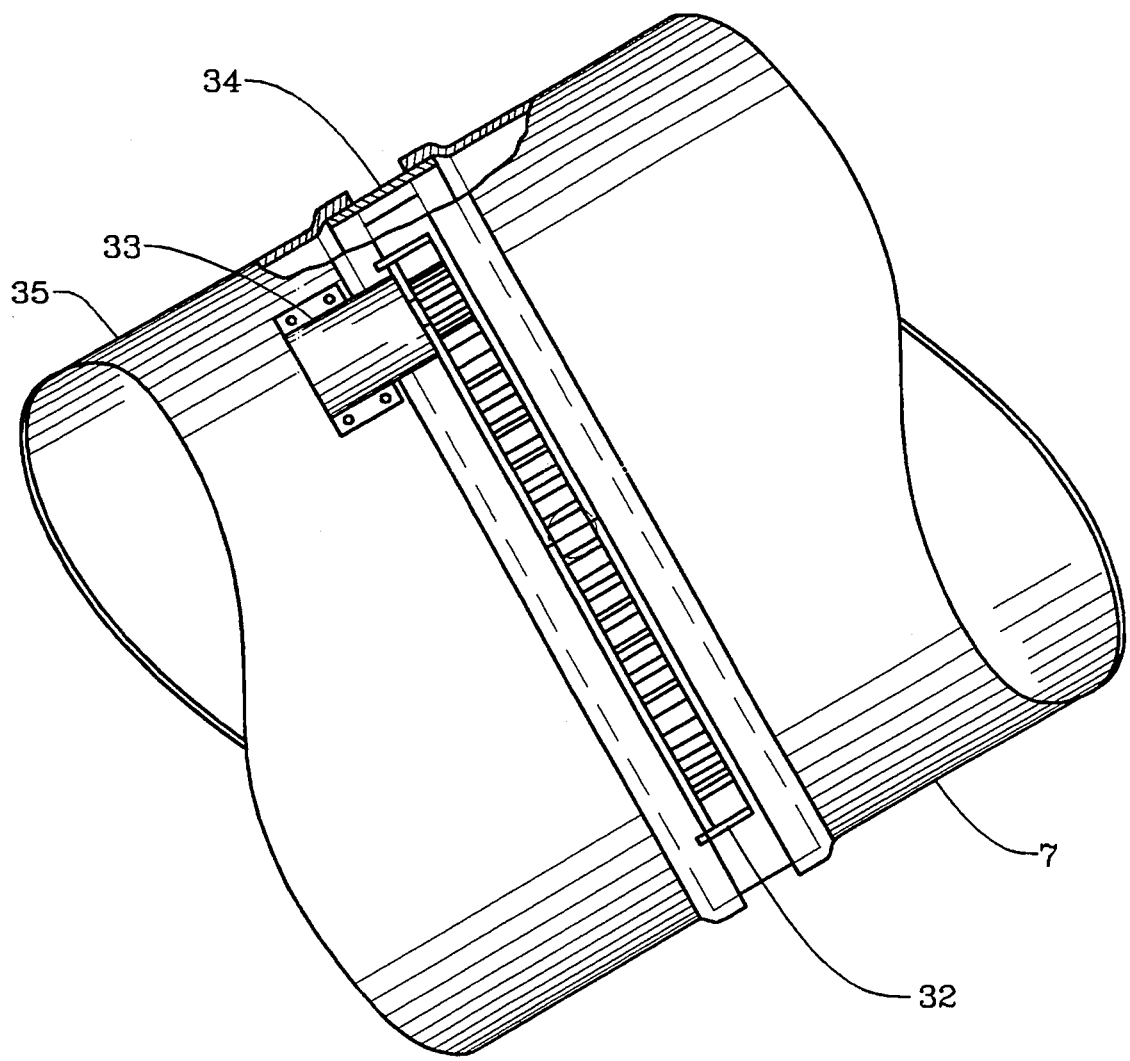
FIG. 26 is a view generally along line 26—26 of FIG. 24.
Figure 27:
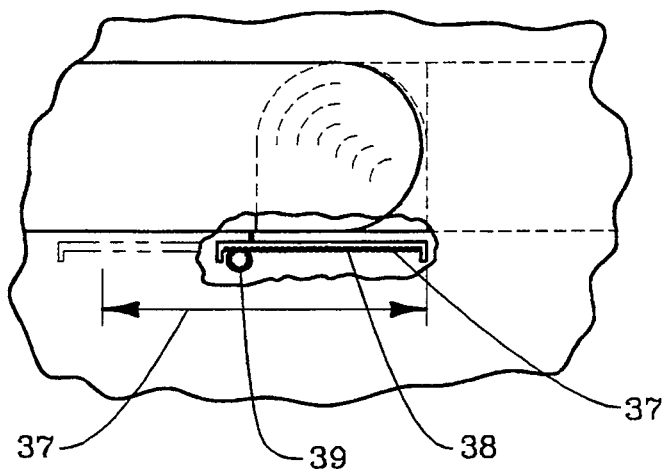
FIG. 27 is a view generally along line 27—27 of FIG. 28.
Figure 28:
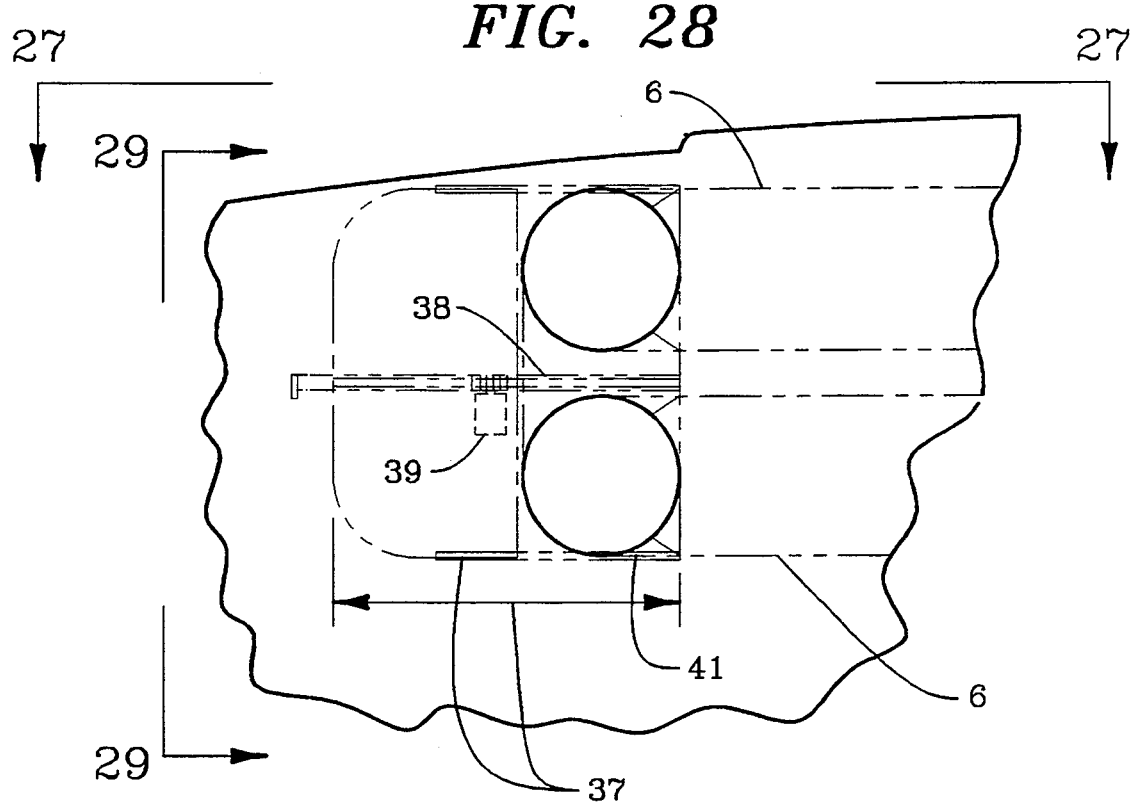
FIG. 28 is a view illustrating the gear drive and gear track assembly of the jet engine assembly.
Figure 29:
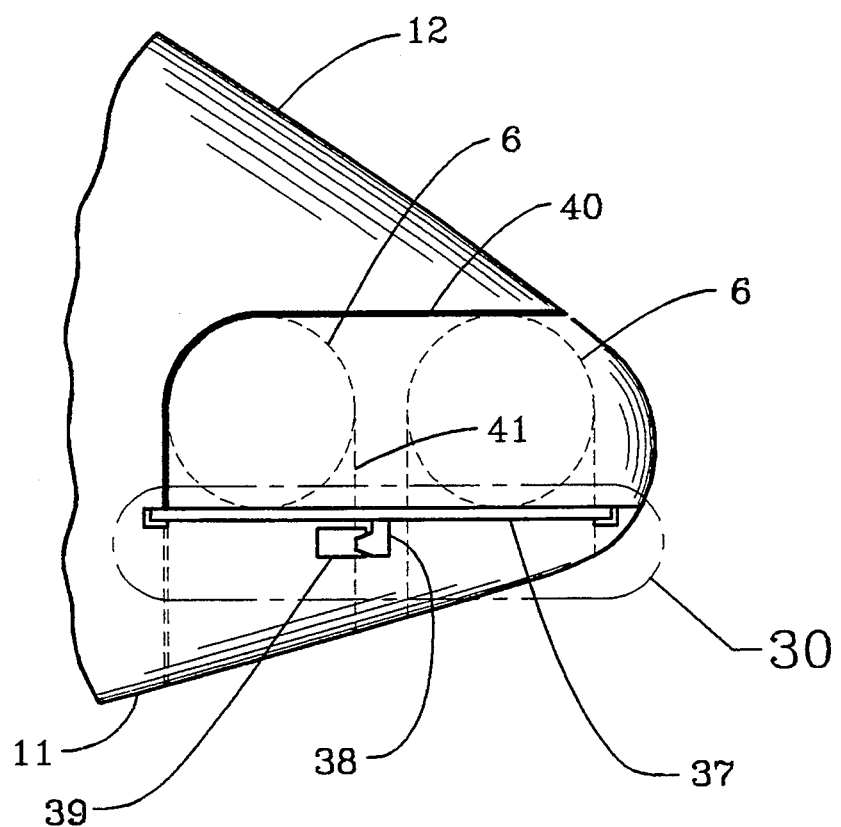
FIG. 29 is a view generally along line 29—29 of FIG. 28.
Figure 30:
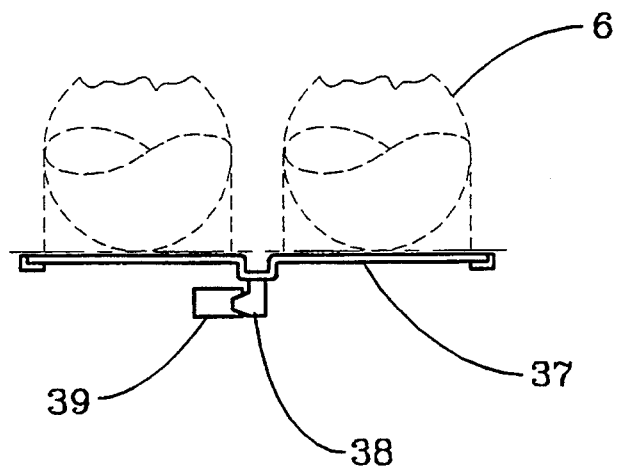
FIG. 30 is a view generally along line 30—30 of FIG. 29.

The ducted fan assemblies 7 may be powered either by solar panels 5, or individually powered by an alternative power means 8. As best seen in FIGS. 2 and 15, each alternative power means 8 is mounted co-longitudinally to its corresponding ducted fan assembly 7. Alternative power means 8 may be an electric motor, a power generator, a small gas-driven turbo engine, or any suitable power plant known in the art.

Referring now to FIGS. 15-19, there is shown a ducted fan assembly 7 comprising fan blades 27 and structural support members 28 as known in the art. Alternative power plant 8 is mounted to structural support sleeve 36, which is itself connected to support members 28. Fuel feeder lines from a master fuel tank or tanks, dedicated to each individual jet engine 6, ducted fan assembly 7, or power plant 8, are connected through the nearest structural support member 28. Similarly, electric wiring to control start-up and RPM of power plants 8 are connected through the nearest structural support member 28. A plurality of vanes or louvers 29 are pivotally mounted by bearing 47 to a rotatable sleeve 34 proximate the outlet of the fan assembly 7. Member 30 is pivotally mounted to the vanes 29 and is transverse to the vanes 29, such that if any one of the vanes is pivoted, all the vanes are correspondingly pivoted. A stationary sleeve 35 is also proximate the outlet of fan assembly 7 and is positioned below rotatable sleeve 34.

Referring now to FIGS. 15, and 24–26, an electric drive 31 is pivotally attached to rotatable sleeve 34, and is further pivotally attached to one of the vanes 29. Power may be delivered to electric drive 31 by the solar panels 5. When electric drive 31 is activated, it pivots, causing the vane 29 attached to electric drive 31 to pivot, which in turn causes each of the vanes 29 to pivot as described above. In so doing, the thrust produced by the ducted fan assembly 7 may be angularly adjusted to facilitate either VTOL or horizontal flight. Furthermore, a gear track assembly 32 and a gear drive assembly 33 are attached to rotatable sleeve 34 and stationary sleeve 35, respectively, such that when gear drive 33 is activated, it engages gear track 32, causing rotatable sleeve 34 to rotate. In the preferred embodiment, rotatable sleeve 34 is configured for 90° of rotation. The foregoing configuration permits a three-dimensional pivoting of vanes 29, allowing the thrust produced by fan assembly 7 to be angularly adjusted to accommodate either VTOL or horizontal flight. Each ducted fan assembly's electric drive 31, gear drive 33 and gear track 32, may be controlled individually, or may be synchronized to control directional change of the thrust produced by the fan assembly 7, thereby facilitating roll, pitch, yaw, and directional control of the flying disc 1.

Referring now to FIGS. 9–14 and FIGS. 20–23, there is shown a thrust deflector assembly 41. A plurality of vanes or louvers 48 are pivotally mounted by bearing 49, to a rotatable sleeve 42, proximate the outlet of the thrust deflector assembly 41. Member 50 is pivotally mounted to the vanes 48, and is transverse to the vanes 48, such that if any one of the vanes is pivoted, all the vanes are correspondingly pivoted. Ball bearings 43 are equally spaced around the circumference of both thrust deflector assembly 41, and sleeve 42, to ensure proper rotation. A dowel or lock pin 52 is mounted to thrust deflector assembly 41 and aids in holding thrust deflector assembly 41 in a secure position. A half retainer ring 53 is mounted to engine 6 to accommodate the thrust deflector assembly 41. Another half retainer ring 54 is mounted to the inner periphery of thrust deflector assembly 41 to ensure correct engagement and disengagement of thrust deflector assembly 41 with engine 6. An alternate embodiment of a joint mounting which provides quick connect and disconnect between engine 6 and thrust deflector assembly 41 is shown in FIGS. 13, 14, 21 and 22.

An electric drive 51, is pivotally attached to rotatable sleeve 42, and is further pivotally attached to one of the vanes 48. Power may be delivered to electric drive 51 by the solar panels 5. When electric drive 51 is activated, it pivots, causing the vane 48 attached to electric drive 51 to pivot, which in turn causes each of the vanes 48 to pivot as described above. In so doing, the thrust produced by the jet engine 6 may be angularly adjusted to facilitate VTOL flight. In addition, thrust converters 46 are attached to the inner periphery of thrust deflector assembly 41, and aid in the deflection of thrust produced by jet engine 6. Furthermore, a gear track assembly 44 and a gear drive assembly 45 are attached to rotatable sleeve 42 and thrust deflector assembly 41, respectively, such that when gear drive 45 is activated, it engages gear track 44, causing rotatable sleeve 42 to rotate. In the preferred embodiment, rotatable sleeve 42 is configured for 90° of rotation. The foregoing configuration permits a three-dimensional pivoting of vanes 48, allowing the thrust produced by the jet engines 6 to be angularly adjusted to accommodate either VTOL or horizontal flight. Each thrust deflector assembly's electric drive 51, gear drive 45, and gear track 44, may be synchronized to control directional change of the thrust produced by the thrust deflector assembly 41, thereby facilitating roll, pitch, yaw, and directional control of the flying disc 1.

Once the desired vertical altitude has been achieved, the transition to horizontal flight is as follows. The 90° thrust deflector assembly 41 will automatically retract as hereinafter described. Referring to FIGS. 9–14, 20–23, and 27–30, a gear track assembly 58 and a gear drive assembly 59 are attached to thrust deflector assembly 41 and to outlet duct assembly 40, respectively, such that when gear drive 59 is activated, it engages gear track 58, causing thrust deflector assembly 41 to move or retract. After thrust deflector assembly 41 is retracted, retractable cover 37 is closed as follows. A gear track assembly 38 and a gear drive assembly 39 are attached to retractable cover 37 and the understructure of outlet duct assembly 40, respectively, such that when gear drive 39 is activated, it engages gear track 38, causing retractable cover 37 to close. After closing retractable cover 37, another retractable cover 55 is closed as follows. A gear track assembly 56 and a gear drive assembly 57 are attached to retractable cover 55 and to the understructure of outlet duct assembly 40, respectively, such that when gear drive 57 is activated, it engages gear track 56, causing retractable cover 55 to close. The above-described transition is reversed for the vertical takeoff and landing mode.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A vertical takeoff and landing (VTOL) flying disc comprising:

a circular disc-like airfoil-shaped wing structure having a convex upper surface and a concave lower surface, said wing structure further having a leading edge and a trailing edge;

means for delivering power, said means for delivering power consisting essentially of the outer skin of said convex upper surface;

means for storing helium gas, said means for storing helium gas having an upper boundary defined by said convex upper surface and a lower boundary defined by a passenger deck;

means for producing thrust, said means for producing thrust connected to said circular wing structure; and means for angularly adjusting the thrust produced by said means for producing thrust, said means for angularly adjusting comprising a plurality of vanes pivotally attached to a rotatable sleeve, said rotatable sleeve being attached proximate the outlet of said means for producing thrust, said rotatable sleeve further being positioned above a stationary sleeve;

a member pivotally mounted to said vanes, said member being transverse to said vanes; and means for selectively pivoting said vanes three-dimensionally 2. The VTOL flying disc of claim 1, wherein said means for delivering power is a plurality of solar panels.

3. The VTOL flying disc of claim 1, wherein said means for producing thrust includes the combination of:
jet engine members; and
ducted fan assemblies.

4. The VTOL flying disc of claim 3, wherein at least one turbofan or turbojet engine is mounted on each of said leading and trailing edges.

5. The VTOL flying disc of claim 3, wherein at least two turbofan or turbojet engines are mounted on each of said leading and trailing edges.

6. The VTOL flying disc of claim 3, wherein said ducted fan assemblies are mounted symmetrically about the circumference of said wing structure.

7. The VTOL flying disc of claim 6, wherein said ducted fan assemblies are powered by said means for delivering power.

8. The VTOL flying disc of claim 7, wherein each of said ducted fan assemblies is powered individually by a second means for delivering power.

9. The VTOL flying disc of claim 8, wherein said second means for delivering power is mounted co-longitudinally to said ducted fan assemblies.

10. The VTOL flying disc of claim 9, wherein said second means for delivering power is an electric motor, a power generator, or a gas-driven turbo engine.

11. The VTOL flying disc of claim 1, wherein said means for selectively pivoting includes the combination of:

a gear drive assembly and a gear track assembly mounted to said stationary sleeve and said rotatable sleeve, respectively, wherein when said gear drive assembly is activated, said gear track assembly is engaged, thereby rotating said rotatable sleeve, causing said vanes to rotate; and a second drive assembly pivotally attached to said rotatable sleeve, said second drive assembly further being pivotally attached to one of said vanes, wherein when said second drive assembly is activated, said vanes are pivoted.

12. A vertical takeoff and landing flying disc comprising:

a circular disc-like airfoil shaped wing structure having a convex upper surface and a concave lower surface, said wing structure further having a leading edge and a trailing edge;

a plurality of solar panels mounted to said convex upper surface, said solar panels for delivering power;

means for storing helium gas, said means for storing helium gas having an upper boundary defined by said convex upper surface and a lower boundary defined by a passenger deck;

means for producing thrust connected to said circular wing structure, said means for producing thrust including the combination of jet engine members and ducted fan assemblies, wherein at least one of said jet engine members is mounted to each of said leading and trailing edges respectively, wherein said ducted fan assemblies are mounted symmetrically about the circumference of said wing structure; and means for angularly adjusting the thrust produced by said means for producing thrust, said means for angularly adjusting including a plurality of vanes pivotally attached to a rotatable sleeve, said rotatable sleeve being attached proximate the outlet of said means for producing thrust, said rotatable sleeve further being positioned above a stationery sleeve, a member pivotally mounted to said vanes, said member being transverse to said vanes, a gear drive assembly and a gear track assembly mounted to said stationery sleeve and said rotatable sleeve, respectively, such that when said gear drive assembly is activated, said gear track assembly is engaged, thereby rotating said rotatable sleeve, causing said vanes to rotate, and a second drive assembly pivotally attached to said rotatable sleeve, said second drive assembly further being pivotally attached to one of said vanes, wherein when said second drive assembly is activated, said vanes are pivoted.

* * * * *